(12) United States Patent  (10) Patent No.: US 6,676,174 B2
Reynolds et al.  (45) Date of Patent: Jan. 13, 2004

(54) LATCH ASSEMBLY FOR TRUCK BED COVERS

(76) Inventors: James F. Reynolds, 1371 Kirkmichael Cir., Riverside, CA (US) 92507; Kenneth L. Earhart, 11671 Stephanie La., Garden Grove, CA (US) 92840; Ted S. Adams, 7820 Iroquois St., Fontana, CA (US) 92336

( * ) Notice: Subject to any disclaimer, the term of this patent is extended or adjusted under 35 U.S.C. 154(b) by 42 days.

(21) Appl. No.: 09/775,610

(22) Filed: Feb. 5, 2001

(65) Prior Publication Data

US 2002/0105200 A1 Aug. 8, 2002

(51) Int. Cl.⁷ .................................................. E05C 9/00
(52) U.S. Cl. .............. 292/32; 292/169.14; 292/DIG. 42
(58) Field of Search .............................. 292/32, 169.14, 292/169.11, DIG. 42

(56) References Cited

U.S. PATENT DOCUMENTS

| 33,790 A | * | 11/1861 | Huber ........................ 8/94.32 |
| 2,676,480 A | * | 4/1954 | Check ........................ 70/418 |
| 2,808,279 A | * | 10/1957 | Schlage ................. 292/169.14 |
| 3,073,143 A | * | 1/1963 | Eads ......................... 70/151 R |
| 4,079,989 A | | 3/1978 | Robertson |
| 4,807,921 A | * | 2/1989 | Champie et al. ............. 160/235 |
| 5,096,236 A | * | 3/1992 | Thony .......................... 24/674 |
| 5,121,950 A | * | 6/1992 | Davidian .................... 292/164 |
| 5,141,268 A | * | 8/1992 | Keller ........................ 292/150 |
| 5,593,191 A | * | 1/1997 | DeMarco .................... 292/142 |
| 5,911,460 A | * | 6/1999 | Hawkins et al. ............. 292/144 |
| 5,975,592 A | * | 11/1999 | Lin ............................. 292/159 |
| 6,076,881 A | | 6/2000 | Tucker |
| 6,081,186 A | | 6/2000 | Adams |
| 6,095,574 A | * | 8/2000 | Dean .......................... 292/164 |
| 6,217,087 B1 | * | 4/2001 | Fuller .......................... 292/33 |
| 6,247,732 B1 | * | 6/2001 | Alton ......................... 292/216 |
| 6,283,515 B1 | * | 9/2001 | Redan ........................ 292/144 |
| 6,361,086 B1 | * | 3/2002 | Robbins et al. ............. 292/158 |

FOREIGN PATENT DOCUMENTS

GB 2175950 A * 12/1986

* cited by examiner

*Primary Examiner*—Robert J. Sandy
*Assistant Examiner*—Thomas Ho
(74) *Attorney, Agent, or Firm*—Edgar W. Averill, Jr.

(57) ABSTRACT

A latch assembly for releasably latching a truck bed cover to a sidewall of a pickup truck bed. A striker is preferably mounted to the truck sidewall and a movable elongated latch arm is connected to the truck bed cover, such that the latch arm may be moved between engaged and released positions. A pivot arm having a blocking element is pivotally connected to the latch arm such that actuation of the latch arm to the released position causes the blocking element to interposedly obstruct re-engagement of the released latch member back to the striker. The blocking element operates to maintain the released position of the elongated latch arm until a time when a user may raise open the truck bed cover to an open position.

17 Claims, 5 Drawing Sheets

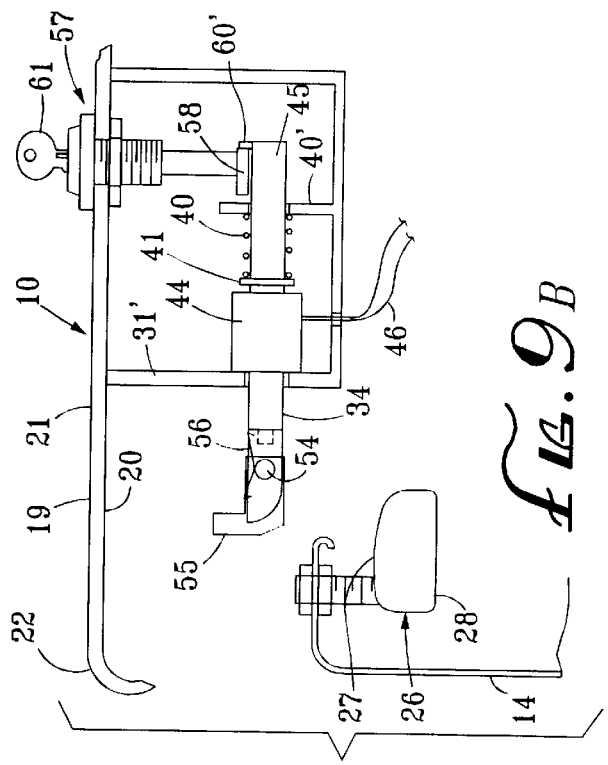
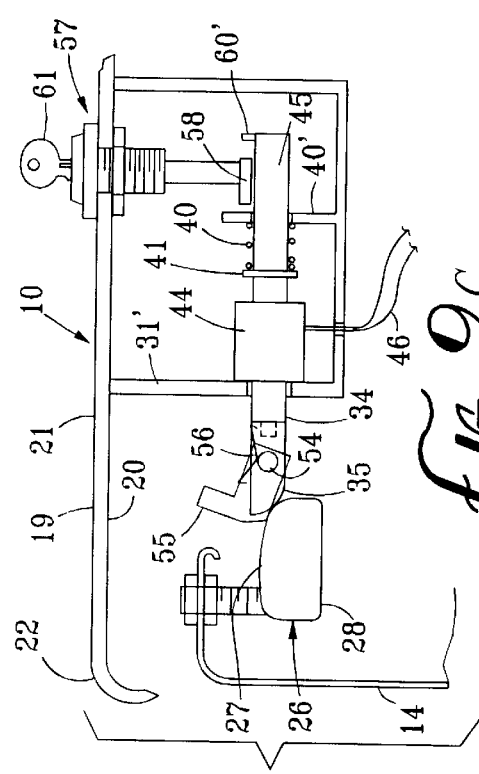
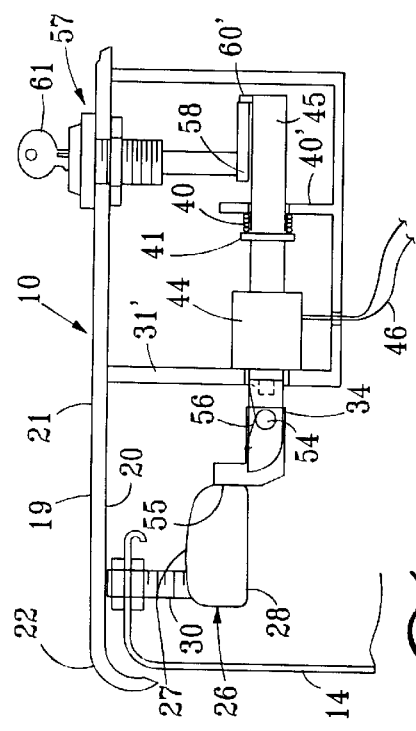

LATCH ASSEMBLY FOR TRUCK BED COVERS

BACKGROUND OF THE INVENTION

The field of the invention generally pertains to latch assemblies. More particularly, the invention relates to a latch assembly for releasably latching a truck bed cover to a pickup truck bed, wherein the actuation of an elongated latch member to a released position causes a blocking element to obstruct the now-released latch member from re-engaging a striker. In this manner the latch assembly operates to indefinitely maintain the elongated latch member in the released position until a time when the driver wishes to raise open the cover.

Pickup trucks are typically provided with an open top bed/cargo area bordered by left and right sidewalls, a front wall (or cab wall), and a tailgate adapted to swing open to allow convenient access to the cargo area. The open tops of pickup truck beds, however, are known to adversely affect the aerodynamic characteristics of the pickup truck at driving speeds. Thus, it is often preferred to provide a truck bed cover (or "tonneau cover") which extends over and encloses the open bed to reduce drag and substantially improve the airflow dynamics of the pickup truck. Truck bed covers, especially those with rigid constructions, also help prevent unauthorized access and/or theft of items stored in the bed, as well as protect such stored items from exposure to harsh environmental elements. Furthermore, truck bed covers also serve to enhance the aesthetic and stylistic appearance of pickup trucks by streamlining the surfaces and contours of the pickup truck body.

With the growing popularity of truck bed covers as accessory items for pickup trucks, various devices and methods have been developed for releasably securing such truck bed covers to the open top beds of pickup trucks.

One typical approach is to utilize a latch device designed for manual release by a user. For example, in U.S. Pat. No. 4,079,989, a pickup bed topper is shown with a latching mechanism 82 which operates to extend a pair of opposing arms 88 into a pair of slots located on each sidewall of the truck bed. The arms 88 are actuated by a handle 84 which is equipped with a conventional key operated lock. This arrangement, however, requires a driver to first exit the cab of the pickup truck and go to the latch itself in order to lock or unlock the pickup bed topper from the truck bed. More importantly, the driver must manually perform each latching and unlatching movement of the arms 88 himself, without having the convenience of an automatic engagement of the latch mechanism upon closing the topper relative to the truck bed.

Additionally, in U.S. Pat. No. 6,076,881, a flip hatch tonneau cover is shown having a latch mechanism 60 which must also be manually released by the user. Similar to the '989 patent, the driver must first exit the cab of his pickup truck and open the tailgate 29 to gain access to the latch mechanism. Once accessed, a latch plate handle 62 must be manually pivoted to clear a latch pin 108 such that a rear frame 48 of the tonneau cover may be pivotally raised upward. It is particularly notable, however, that in order to raise the rear frame 48, the user himself must manually maintain the handle 62 clear of the latch pin 108.

And although not specifically directed to latching truck bed covers to pickup truck beds, a low-powered door alarm and lock system is shown in U.S. Pat. No. 6,081,186 utilizing a solenoid 46 (FIG. 4) to briefly move a pin 42 to a released position, such that a latch gate 44 may in turn release a striker 47. However, the operation of the solenoid and subsequent raising of the pin is only for a time period of less than 1 second, and the pin falls again due to gravity to re-lock the latch gate if not released within the prescribed time.

The approaches disclosed in these aforementioned representative patents, illustrate certain disadvantages which are present in the prior art. In the '989 and '881 patents in particular, the limitation and inconvenience of having to manually release the latch mechanism from outside the cab of the pickup truck can be clearly appreciated. Furthermore, the latch devices in the '881 and '186 patents do not enable their respective latching/engaging elements to be maintained in the released or clear position due to the operation of an automatic re-engagement mechanism, such as a biasing strut 70 in the '881 patent, and the pin 42 in the '186 patent which falls back into re-engagement due to gravity. Thus, a user cannot repeatedly open and close a truck bed cover, door, or access panel without having to re-release the latch each time. While automatic re-engagement mechanisms provide certain advantages to the operation of latch devices, the ability to maintain the release of the latching/engaging element would also provide a substantial advantage and convenience to the driver or user, especially when frequent and quick access into the truck bed cargo area is required.

BRIEF SUMMARY OF THE INVENTION

It is thus an object of the present invention to provide a latch assembly for releasably latching a truck bed cover to the bed of a pickup truck, wherein the latch assembly may be maintained indefinitely in a released position, against the re-engagement tendencies of a re-engagement mechanism, until a time when a user desires to raise open the truck bed cover relative to the pickup truck.

It is a further object of the present invention to provide a latch assembly for releasably latching two relatively movable bodies to each other, wherein the latch assembly may be maintained indefinitely in a released position, against the re-engagement tendencies of a re-engagement mechanism, until a time when a user desires to effect relative movement of the relatively movable bodies.

It is a still further object of the present invention to provide a latch assembly which utilizes a blocking element to prevent re-engagement of a released latching/engaging element to a striker, wherein the blocking element is caused to move to an obstructing position upon actuation of the latching/engaging element to the released position.

It is a still further object of the present invention to provide a latch assembly which utilizes a blocking element to prevent re-engagement of a released latching/engaging element to a striker, wherein the blocking element is caused to move to an obstructing and interposed position between the released latching/engaging element and the striker, upon actuation of the latching/engaging element to the released position.

It is a still further object of the present invention to provide a remotely operated latch assembly for releasably latching a truck bed cover to the bed of a pickup truck, wherein the latch assembly may be remotely released from within the cab portion of the pickup truck.

It is a still further object of the present invention to provide a remotely operated latch assembly utilizing a solenoid to effect the remote release of a latching/engaging element.

It is a still further object of the present invention to provide a simple and cost-effective latch assembly utilizing a minimum number of parts to effect the foregoing objects, and which is easily manufactured by conventional manufacturing methods.

The present invention is for a latch assembly for releasably latching a first body of a truck bed cover and a second body of a truck bed to each other. The first and second bodies are adapted to move between open and closed positions relative to each other. The latch assembly comprises a striker which is secured to one of the first and second bodies, and a latch member which is movably connected to the other of the first and second bodies. The latch assembly also comprises resiliently biasing means, such as a coil spring, for urging the latch member to achieve latched engagement with the striker when the first and second bodies are in the closed position. The latch assembly also comprises main actuator means, such as a solenoid assembly, which is operably connected to the latch member for actuating the latch member to a released position away from the striker. Furthermore, the latch assembly comprises stopper means, such as a pivot arm, for obstructing re-engagement of the released latch member with the striker. The stopper means has a blocking element which is caused to move from a non-obstructing position to an obstructing position upon the latch member being actuated to the released position by the main actuator means. In this manner, the released latch member is maintained in the released position by the stopper means to enable relative movement of the first and second bodies to the open position.

BRIEF DESCRIPTION OF THE DRAWINGS

FIG. 4 is a partial plan view of a rear portion of the truck bed, illustrating the mounting of a pair of strikers 26.

FIG. 9A is a cross-sectional view of a second preferred embodiment of the latch assembly which is secured to the left rear corner area of the truck bed cover and truck bed shown in FIG. 1, and as viewed from the rear of the pickup truck. Latch member 34 is shown manually actuated to the released position by means of a cam 58 shown moved to a releasing position.

FIG. 9B is a cross-sectional view of the second preferred embodiment of the latch assembly similar to and following FIG. 9A, showing the raising movement of the truck bed cover to an open position from the truck bed, and with the cam 58 returned to a non-releasing position.

FIG. 9C is a cross-sectional view of the second preferred embodiment of the latch assembly similar to and following FIG. 9B, illustrating the return engagement of the latch member with the striker while the cam 58 remains in the non-releasing position.

DESCRIPTION OF THE PREFERRED EMBODIMENTS

Figure 1:
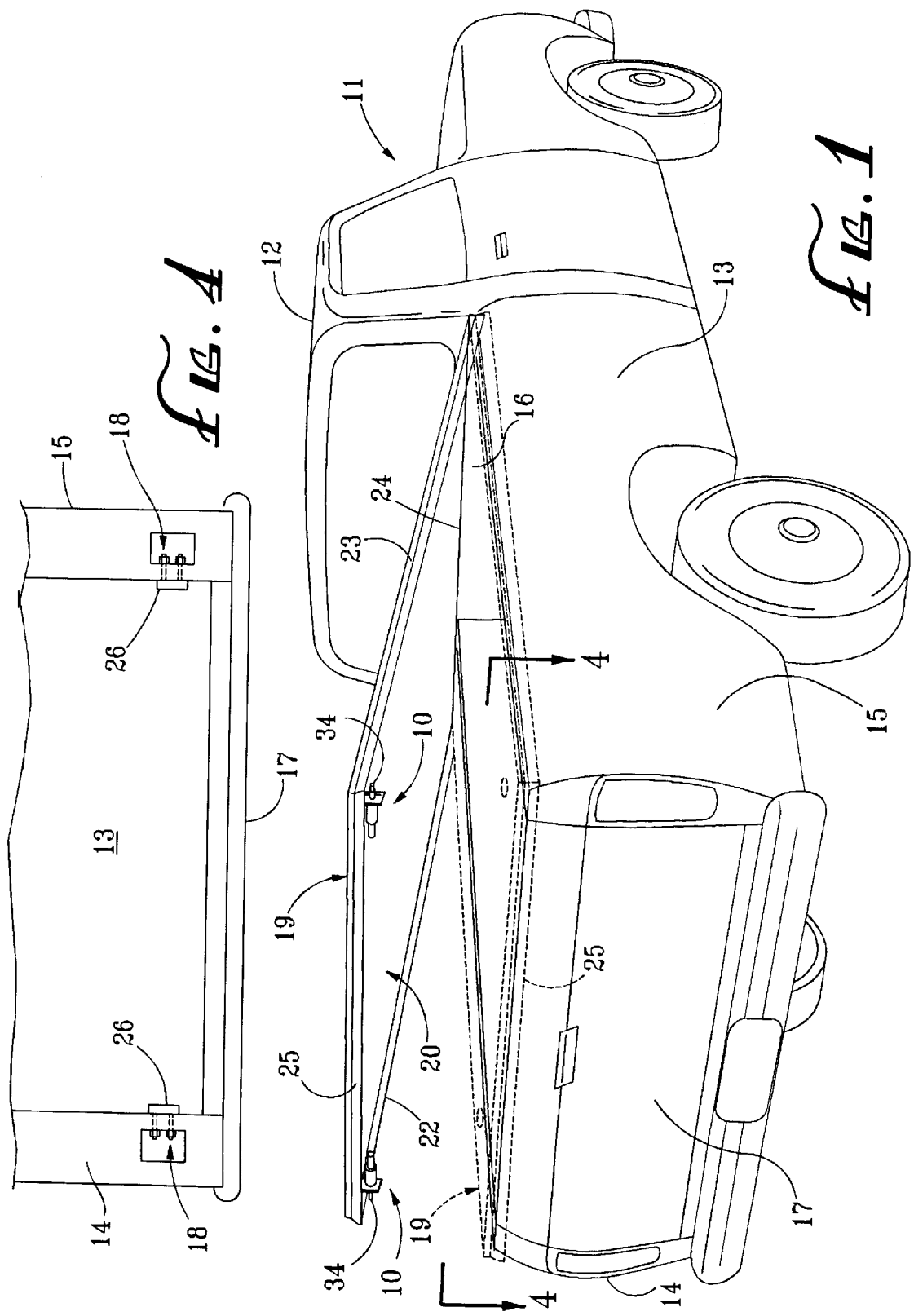
FIG. 1 is a rear perspective view of a pickup truck having a truck bed cover pivotally secured to the bed portion of the pickup truck and movable between an open position (shown in solid lines), and a closed position (shown in broken lines).

Referring now to the drawings, FIG. 1 shows a rear perspective view of a pickup truck, generally indicated at reference character 11, having a truck bed cover or "tonneau cover" 19 pivotally mounted to the truck 11 at one end, such that the cover 19 may pivotally move between open and closed positions relative to the truck 11. A latch assembly (or combination of latch assemblies) according to the present invention operates to releasably latch the cover 19 to the bed portion 13 of the pickup truck 11 in a manner to be discussed in detail below.

As shown in FIG. 1, the pickup truck 11 has a cab portion 12, and a bed portion 13 to the rear of the cab portion 12. The bed portion 13 has an open top configuration with a cargo area surrounded by a left sidewall 14, a right sidewall 15 opposite the left sidewall 14, a front or cab sidewall 16 adjacent the cab portion 12, and a tailgate 17 opposite the cab sidewall 16 between the left 14 and right 15 sidewalls. It is appreciated that the sidewalls 14–16 and tailgate 17 commonly have multi-paneled constructions which enclose inner volumes. Such multi-paneled constructions allow various mechanical, electrical, and other systems components and wiring to be located internally within the walls of the truck 11.

Furthermore, the truck bed cover 19 preferably has a generally planar configuration with a left edge 22, a right edge 23, a front edge 24, and a rear edge 25. The front edge 24 of the cover 19 is preferably hinge-mounted to the front wall 16 of the truck bed 13 such that the rear edge 25 of the cover 19 may be raised to an open position (shown in solid lines) and lowered to a closed position (shown in broken lines) relative to the truck bed 13. It is notable that in the closed position, the cover 19 is preferably seated on and supported by the upper edges of the left sidewall 14, right sidewall 15, cab sidewall 16, and tailgate 17 to enclose the cargo area. However, various other mounting configurations and arrangements of the cover 19 to the bed portion 13 may be alternatively utilized, and is not limited to the preferred mounting configuration and arrangement described herein. It is further notable that the cover 19 preferably has a rigid body construction made from, for example, a polymeric, fiberglass, or composite material, to deter unauthorized access into the cargo area. It is appreciated, however, that soft truck bed covers constructed of fabric or other pliable material may also be utilized in lieu of a completely rigid body cover by providing a rigid body portion to which the latch assembly of the present invention may be securely mounted.

With reference to FIGS. 2 and 3A–C, a first preferred embodiment of a latch assembly of the present invention is generally indicated at reference character 10. In particular, FIGS. 2 and 3A–C show a cross-sectional view of the latch assembly 10 which is secured to the left rear corner area of the truck bed cover 19 and truck bed 13 (see FIG. 1). It is appreciated, however, that the following discussion of the latch assembly is illustrative of the latch assembly mounting and operation generally, and is not limited in its application to the left corner area alone, i.e. the left sidewall 14 and the left edge 22 of the cover 19.

Figure 2:
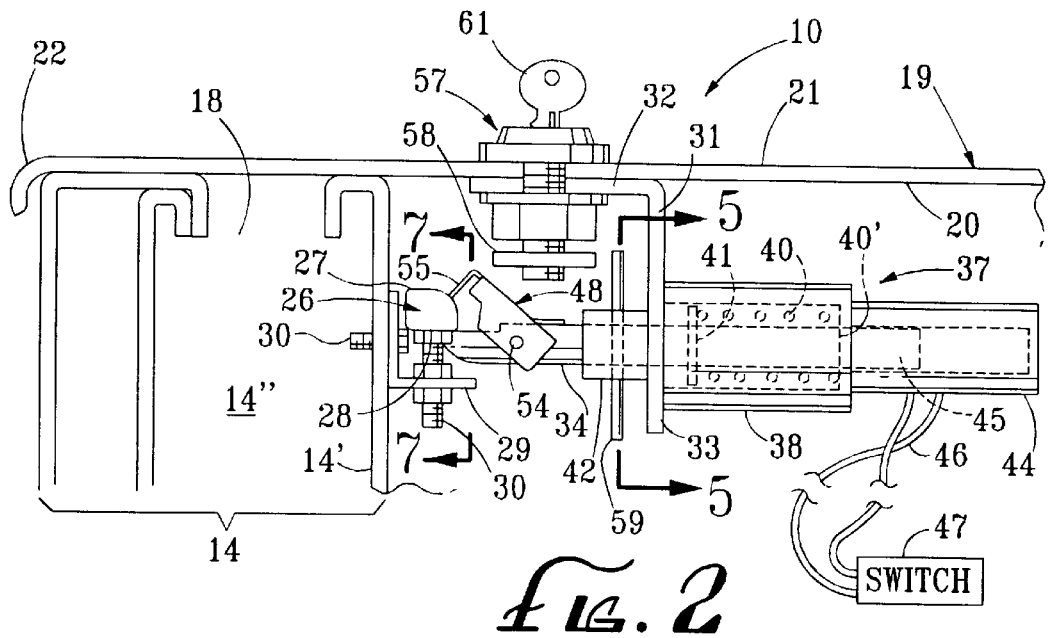
FIG. 2 is a cross-sectional view of a first preferred embodiment of the latch assembly which is secured to the left rear corner area of the truck bed cover and truck bed shown in FIG. 1, and as viewed from the rear of the pickup truck. Latch member 34 is shown in the engaged position with the pivot arm 48 in the non-obstructing position.
Figure 3A:
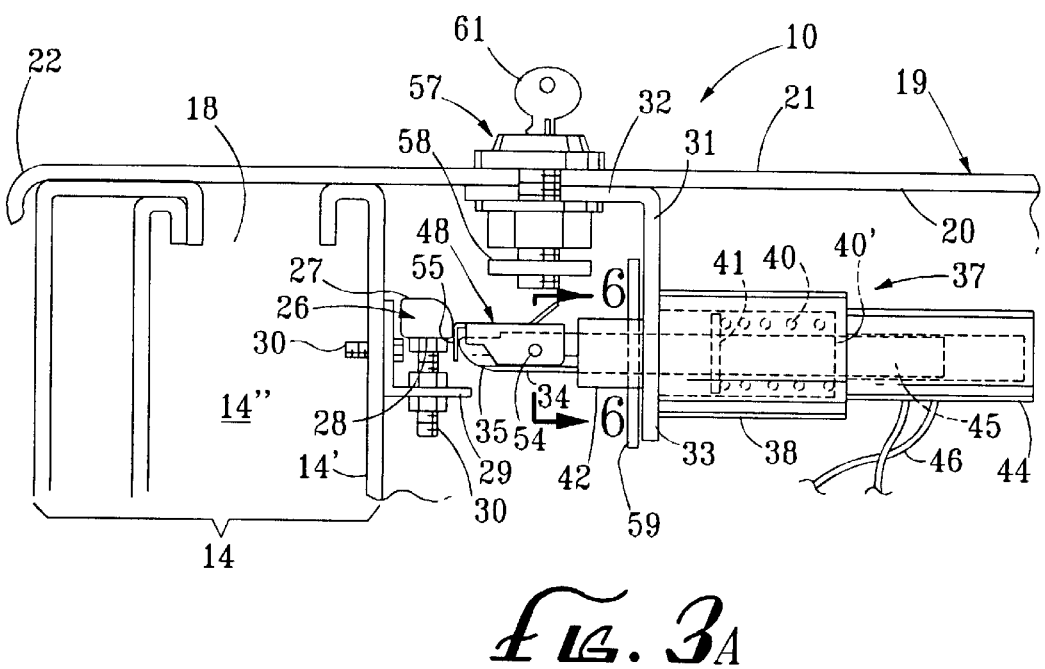
FIG. 3A is a cross-sectional view of the first preferred embodiment of the latch assembly similar to and following FIG. 2, showing the latch member 34 in the released position and the pivot arm 48 in the obstructing position.

As can be seen in FIGS. 2 and 3A–C, the latch assembly 10 includes a striker block 26 having a hard, rigid construction, with an upper strike surface 27 and a lower abutment surface 28. The striker 26 may be constructed from a suitable metallic material, such as steel, or even a suitable non-metallic, polymeric, or composite material, so long as it possesses substantially rigid, durable, and impact-resistant qualities. The upper strike surface 27 is preferably rounded along its outer edge, such that a latch member 34 may ramp past and re-engage with the striker 26 (see discussion below). The striker 26 is shown in FIGS. 2 and 3A–C mounted along its lower abutment surface 28 to an L-shaped bracket 29 by means of mounting bolts 30. Furthermore, the L-shaped bracket 29 itself is preferably secured to the left sidewall 14 also by means of mounting bolts 30. It is appreciated, however, that other methods of securing the striker 26 to the left sidewall 14 are contemplated, and is not limited only to the use of such L-shaped brackets. In any case, the L-shaped bracket 29 is secured to an inner panel 14' of the multi-paneled left sidewall 14. It is appreciated that such multi-paneled sidewall constructions are common in pickup truck constructions, as well as for other types of vehicles, wherein an inner wall volume or cavity 14" is formed therebetween. The presence of such inner wall volumes is believed to facilitate mounting of the striker 26 thereon, especially when mounting apertures 18 (FIG. 4) are provided. As can be seen in FIGS. 2 and 3A, the mounting aperture 18 leads into the inner wall volume 14", which is typically used to mount a pole structure to the truck bed 13. Such mounting apertures 18 enable access to an interior side of the inner panel 14' which is opposite the striker 26, whereby lock nuts (not shown) may be fastened to the mounting bolts 30 to securely and rigidly mount the striker 26.

Figures 7, 8:
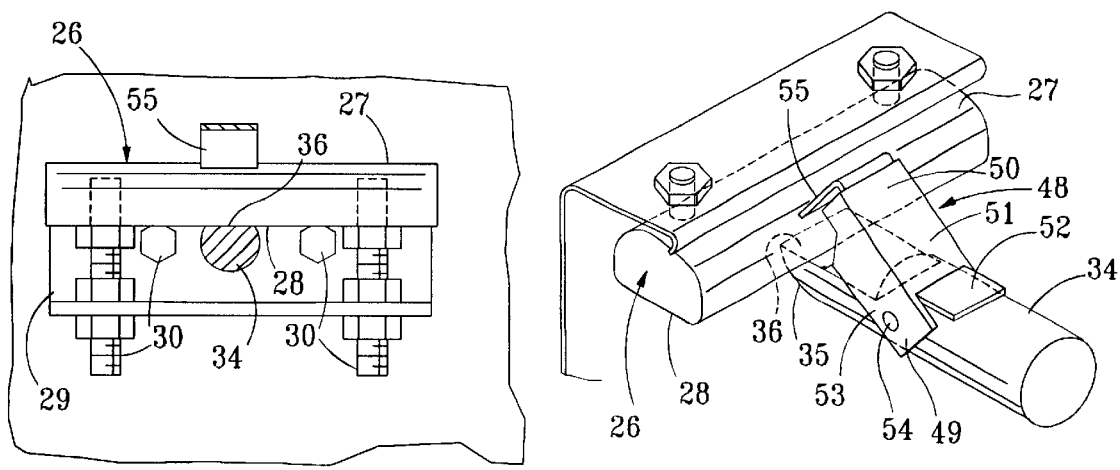
FIG. 7 is a cross-sectional view taken along line 7—7 of FIG. 2, illustrating the non-obstructing position of the blocking element 55 as it rests against the upper strike surface 27 of the striker 26.
FIG. 8 is a perspective view of the latch assembly illustrating the structural details of the first preferred embodiment of the pivot arm.

FIGS. 2 and 3A–C also show the latch assembly 10 having a latch member 34 movably connected to the truck bed cover 19. As can be best seen in FIG. 8, showing the details of a first preferred embodiment of the latch assembly 10, the latch member 34 preferably has an elongated rod configuration with a leading end having a flat upper surface 36 (see FIG. 8) and a convexedly rounded lower tip surface 35. Similar to the striker 26, the latch member 34 also has a hard rigid construction, preferably made of steel or other material which possesses suitably rigid, durable and impact-resistant qualities. Furthermore, the latch member 34 is operably connected to a main actuating device, which functions to actuate the latch member 34 to a released position such that the cover 19 may be raised to the open position. Preferably the main actuating device is a solenoid assembly 37 which operates to actuate the latch member 34 to the released position. As can be seen in the figures, the solenoid assembly 37 preferably includes a spring housing 38 with a coil spring 40 contained therein (see discussion below). The spring housing 38 is preferably further connected to a solenoid housing 44 within which a solenoid core 45 may be energized to move. The solenoid core 45 is suitably coupled to the latch member 34 such that directional movement of the solenoid core 45 and the latch member 34 is unitary and coincident. As shown in FIGS. 2 through 3A–C, the latch member 34 and the solenoid core 45 preferably have an integrally-formed, unitary construction.

Furthermore, a resiliently biasing element or device is provided which urges the latch member 34 to latchably engage the striker 26 when the truck bed cover 19 and bed portion 13 are in the closed position relative to each other. Preferably, the resiliently biasing element or device is the coil spring 40 housed in the spring housing 38. The coil spring 40 is positioned between a fixed surface relative to the moving latch member 34, such as an end wall 40' of the spring housing 38, and a collar 41 attached to the latch member 34 or solenoid core 45. In this manner the coil spring 40 exerts a resiliently biasing force against the collar 41 to urge the latch member 34 to the engaged position. As can be seen in FIG. 2, the coil spring 40 remains relatively unbiased when the latch member 34 is in the engaged position with the striker 26. And as can be best seen in FIG. 3A, the coil spring 40 is relatively resiliently biased when the latch member 34 is in the released position. It is notable that when the solenoid core 45 is energized, actuation of the solenoid core 45 is in a direction opposite the resiliently biasing force of the coil spring 40, and is sufficient to overcome the resiliently biasing force of the coil spring 40.

It is further notable that the activation of the solenoid assembly 37 is preferably by means of an activation switch 47, which is remotely located from the mounting location of the latch assembly 10 by means of electrical wires 46. Although not shown in the figures, the switch 47 is preferably located within the cab portion 12 of the pickup truck 11, such that a user may remotely operate the solenoid assembly 37 to actuate the latch member 34 to a released position while remaining in the cab 12. The switch 47 is preferably of a design common in the electrical arts, such as a rocker switch or push-button switch, which is designed to contact momentarily when pressed by a user to close an electric circuit, and which resets itself to open the circuit when released. Thus the switch 47 enables energizing of the solenoid assembly 37 for a momentary duration sufficient to move the blocking element 55 to the obstructing position, where it obstructs re-engagement of the released latch member 34 after the momentary duration.

Figures 5, 6:
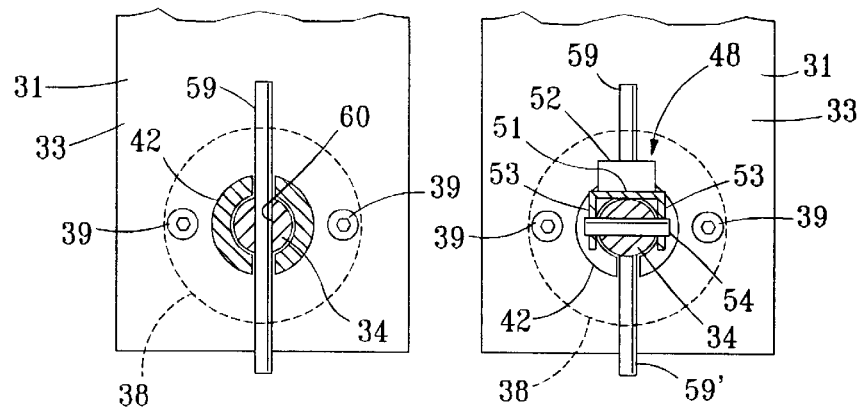
FIG. 5 is a cross-sectional view taken along line 5—5 of FIG. 2, illustrating the mounting of the contact arm 59 on the latch member 34.
FIG. 6 is a cross-sectional view taken along line 6—6 of FIG. 3A, illustrating the pivotal connection of the pivot arm 48 to the latch member 34 by means of a pivot pin 54.

The latch member 34 and solenoid assembly 37 are preferably secured to the truck bed cover 19 by means of an L-bracket 31 having a rigid construction, with a horizontal portion 32 and a vertical portion 33. Similar to the mounting of the striker 26, however, mounting of the latch member 34 and solenoid assembly 37 to the cover 19 is not limited to the use of the L-bracket 31. As can be seen in FIGS. 5 and 6, the spring housing 38 (shown in broken lines) is mounted to the vertical portion 33 by means of mounting screws 39 such that the latch member 34 is oriented horizontally. Furthermore, the horizontal portion 32 of the L-bracket 31 is secured to the truck bed cover 19, as can be seen in FIGS. 2 and 3A–C. Preferably, a lock assembly 57 is also mounted on the truck bed cover 19 through the horizontal portion 32 in a manner which will be discussed later.

Furthermore, the latch assembly 10 includes a stopper device for obstructing re-engagement of latch member 34 with the striker 26, when the latch member 34 is actuated to the released position. The stopper device includes a blocking element which performs the obstructing function when moved from a non-obstructing position to an obstructing position. As shown in FIGS. 2 and 3A–C, the stopper device is preferably a pivot arm 48 which is pivotally connected to the latch member 34 by means of a pivot pin 54. The pivot arm 48 has a base end 49 connected to the latch member 34 by means of the pivot pin 54, a swing end 50 opposite the base end 49, and a blocking element 55 connected to the swing end 50. As shown in FIG. 8, a preferred embodiment of the pivot arm has an upper wall 51 which is connected to a pair of opposite sidewalls 53. And as can be best seen in FIG. 6, the pair of opposite sidewalls 53 are straddled around the latch member 34 such that the pivot pin 54 rotatably extends through the latch member 34 and connects to the pair of opposite sidewalls 53. When the pivot arm 58 is in the obstructing position as shown in FIGS. 2 and 6, the upper wall 51 functions to prevent the pivot arm 48 from pivoting below the latch member 34 by resting against the latch member 34. Furthermore, a stopper flange 52 is provided along the upper wall 51 to abut against the latch member 34 when the pivot arm 48 reaches a predetermined angle, e.g. less than ninety degrees. This operates to limit the pivot arm 48 from pivoting beyond the predetermined angle, such that the pivot arm 48 is ready-poised to move to the obstructing position, as will be discussed in greater detail below.

It is appreciated that multiple latch assemblies may be utilized in combination to effect latching engagement of the cover 19 with the bed portion 13. Thus, FIGS. 1 and 4 illustrate a preferred combination and arrangement of a pair of latch assemblies 10 along the left 14 and right 15 sides of the pickup truck 11. In particular, each latch member 34 of the pair of latch assemblies 10 is preferably movably connected to the truck bed cover 19 near the respective left 22 and right 23 edges (see FIG. 1), and each striker 26 of the pair of latch assemblies 10 is preferably secured to the respective left 14 and right 15 sidewalls of the truck bed 13 (see FIG. 4). It is appreciated that while each latch assembly 10 is preferably substantially identical with other latch assemblies of a multiple assembly configuration, this need not be the case. Furthermore, though not shown in the drawings, the latch assembly 10 may alternatively be located on the rear edge 25 and tailgate 17 to enable latched engagement therebetween. Furthermore, while the exemplary FIGS. 2 and 3A–C illustrate the striker 26 being mounted to the left sidewall 14, and the latch member 34 and solenoid assembly 37 being mounted to the truck bed cover 19, it is appreciated that the striker 26 and the latch member 34 can be reverse mounted, such that the striker 26 is mounted on the bed cover 19 and the latch member 34 is movably connected to the left sidewall 14.

Turning now to the operation of the latch assembly 10, FIGS. 2 and 3A–C illustrate the sequence of movements dictated by the structure of the present invention. As can be best seen in FIG. 2, the solenoid assembly 37 is not yet energized, and the latch member 34 remains latchably engaged to the striker 26 due to the urging of the coil spring 40. When the latch member 34 is in the engaged position, the truck bed cover 19 is prevented from moving to an open position (see FIG. 3B) because the flat upper surface 36 of the latch member 34 contacts or at least confronts the lower abutment surface 28 of the striker 26. Furthermore, when in the engaged position, the pivot arm 48 is not positioned to obstruct engagement of the latch member 34 with the striker 26, i.e. it is in the non-obstructing position. In the non-obstructing position, the blocking element 55 of the pivot arm 48 rests against the upper strike surface 27 of the striker 26 (see FIGS. 2, 7 and 8). Moreover, when resting against the striker 26 in the non-obstructing position the pivot arm 48 is acutely angled such that the blocking element 55 is ready-poised to drop downward upon movement of the latch member 34 away from the striker 26.

FIG. 3A shows a cross-sectional view of the first preferred embodiment of the latch assembly 10 similar to and following FIG. 2 upon momentarily energizing the solenoid assembly 37 to actuate the latch member 34 to the released position away from the striker 26. Movement of the solenoid core 45 causes the latch member 34 to also withdraw from engagement of the striker 26 such that the coil spring 40 is resiliently compressed. More importantly, due to the pivotal connection of the pivot arm 48 to the latch member 34 at the pivot point 54, the blocking element 55 of the pivot arm 48 is pulled sufficiently away from the striker 26 to clear the striker 26. And because the pivot arm 48 extends sufficiently beyond the tip or leading end of the latch member 34 (see FIG. 2) when moved to the obstructing position, the blocking element 55 is positioned sufficiently closer to the striker 26 to effect obstruction. In this manner, and due to the resiliently biasing force of the coil spring 40, the blocking element 55 is caused to preferably abut against the striker. Thus, the blocking element 55 is shown in FIG. 3A obstructing the path of the latch member 34 from re-engaging the striker 26 by abutting against the striker 26. It is notable that inertial momentum of the pivot arm 48 facilitates the pivoting movement of the pivot arm 48 to the obstructing position when the latch member 34 is pulled backwards to the released position. It is further notable that while in the preferred embodiment the blocking element 55 is directly interposed between the striker 26 and the leading end of the latch member 34, it is not limited only to such. Instead, the blocking element 55 may abut against the striker 26 along an abducted position which is removed from the central axis of the latch member 34 in order to effect obstruction.

Figure 3B:
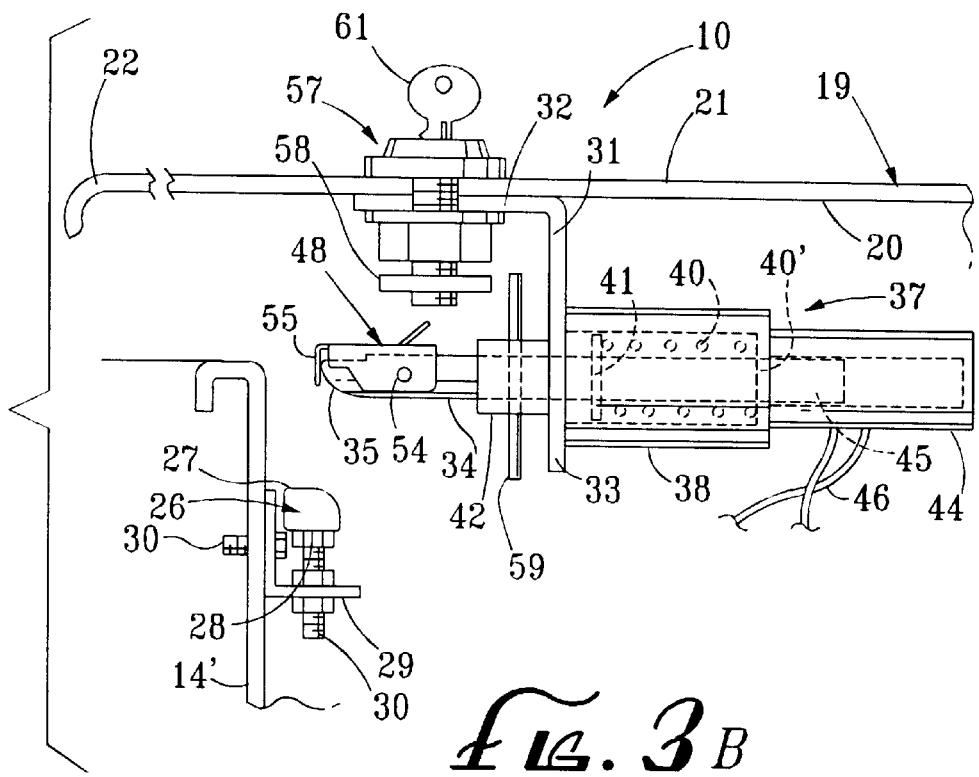
FIG. 3B is a cross-sectional view of the first preferred embodiment of the latch assembly similar to and following FIG. 3A, showing the relative movement of the truck bed cover from the truck bed to the open position.

FIG. 3B shows a cross-section of the first preferred embodiment of the latch assembly 10 similar to and following FIG. 3A wherein, due to the abutting obstruction of the blocking element 55 against the striker 26, the truck bed cover 19 may be raised to an open position such that a user may access the cargo space of the truck bed 13. It is notable that in both FIGS. 3A and 3B, the momentary energization of the solenoid assembly 37 has ceased after a period of time sufficient for the blocking element 55 to pivot to the obstructing position. And the resiliently biasing force of the coil spring 40 again urges the latch member 34 and the pivot arm 48 to abut against the striker 26. Thus, in FIG. 3B, when the truck cover 19 is pulled away from the striker 26 and left sidewall 14, the latch member 34 and the pivot arm 48 are urged by the coil spring 40 to extend horizontally outward and above the striker 26.

Figure 3C:
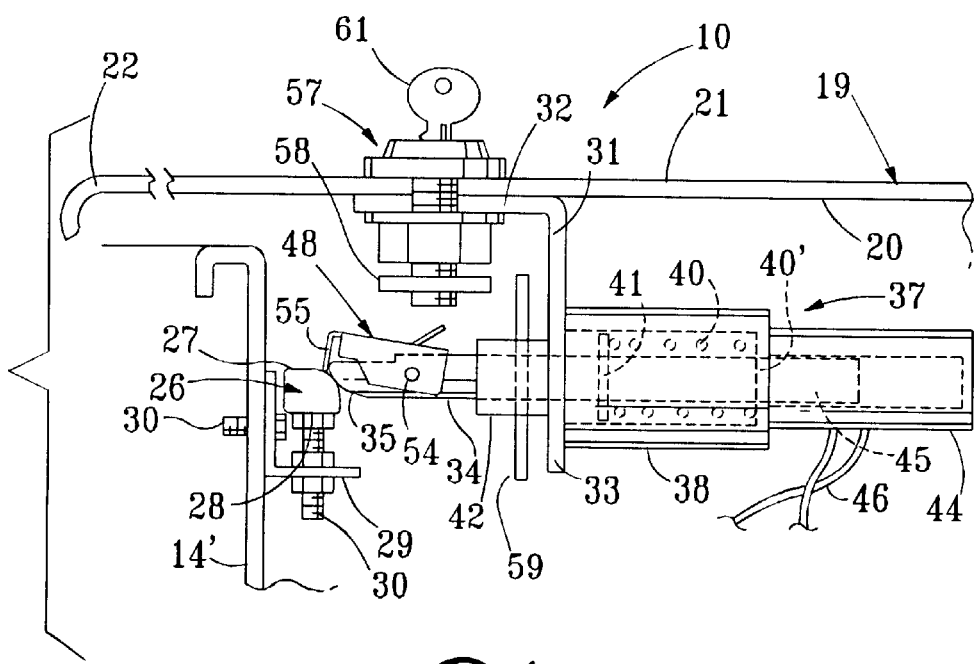
FIG. 3C is a cross-sectional view of the first preferred embodiment of the latch assembly similar to and following FIG. 3B, illustrating the actuation of the pivot arm 48 by the striker 26 to the non-obstructing position, when the latch assembly returns to the engaged and closed position shown in FIG. 2.

FIG. 3C shows a cross-sectional view of the first preferred embodiment of the latch assembly 10 as it begins its re-engagement with the striker 26. In FIG. 3C the blocking element 55 initiates contact with the upper strike surface 27 of the striker 26. And as the cover 19 is further moved downwardly, the striker 26 operates to rotate the pivot arm 48, via the blocking element 55, to the non-obstructing position. Furthermore, the lower curved tip surface 35 of the latch member 34 contactedly slides against the upper strike surface 27 of the striker 26 to ramp the latch member 34 past the striker 26. The ramping action of the latch member 34 against the striker 26 causes the coil spring 40 to be slightly resiliently compressed until the latch member 34 clears the striker 26. Upon clearing the striker 26, the flat upper surface 36 (FIG. 8) of the latch member 34 abuttingly contacts or at least confronts the lower abutment surface 28 of the striker 26 to again engagedly latch the truck bed cover 19 to the left sidewall 14. In this manner, the pivot arm 48 is returned to its non-obstructing position as shown in FIG. 2.

FIG. 9A shows a second preferred embodiment of the latch assembly 10, illustrating the operation of a manual override or auxiliary actuating mechanism for actuating the latch member 34 to the released position without the use of a solenoid. FIG. 9A shows a cross-sectional view of the latch assembly 10 wherein a locking assembly 57 is adapted to receive a key 61. Upon receiving the key 61, a cam 58 may be operated between releasing and non-releasing positions. When in the releasing position, the cam 58 exerts a releasing force against a contact surface 60' of a solenoid cored 45 to cause actuation thereof. In FIG. 9A, latch member 34 is shown coupled to the solenoid core 45, such that the latch member 34 and solenoid core 45 exhibit unitary movement when the cam 58 actuates the contact surface 60'. Thus, in FIG. 9A, the cam 58 is shown exerting the releasing force against the contact surface 60', such that the latch member 34 is moved to the released position, and the pivot arm 48 is pivoted to abut the blocking element 55 against the striker 26 to effect obstruction. It is notable that FIGS. 9A–C also illustrate the use of a coil spring 56 or other mechanism which facilitates movement of the pivot arm 48 to the obstructing position. Preferably a resiliently biasing mechanism, such as the coil spring 56 shown mounted to the pivot pin 54, is utilized to urge the pivot arm 48 to pivot to the obstructing position.

FIG. 9B is a cross-sectional view of the second preferred embodiment of the latch assembly 10, similar to and following FIG. 9A, wherein the cam 58 is returned to the non-releasing position. In the non-releasing position of the cam 58, the coil spring 40 causes the latch member 34 to horizontally extend outward in the direction of the left sidewall 14, such that the blocking element 55 and the tip of the latch member 34 are positioned vertically above the striker 26. Thus, as shown in FIG. 9C, when the truck bed cover 19 is returned from the open position to the closed position, the lower tip surface 35 of the latch member 34 and the blocking element 55 come in sliding contact with the upper strike surface 27 of the striker 26. Thus, as discussed previously, the striker 26 operates to return the blocking element 55 to its non-obstructing position and the curved lower tip surface 35 of the latch member 34 operates to ramp past the striker 26 until latched engagement is achieved against the lower abutment surface 28 of the striker 26.

It is notable that the auxiliary actuating mechanism described for the second preferred embodiment of the latch assembly 10 applies similarly to the first preferred embodiment shown in FIGS. 2 and 3A–C. In the first preferred embodiment however, a contact arm 59 having a contact surface (see FIGS. 5 and 6) is provided which is mounted in a contact arm mounting bore 60 of the latch member 34. The contact arm 59 is preferably guided along a slot track of a track structure 42 which is also secured to the L-bracket 31 used to secure the latch member 34 and solenoid assembly 37 to the cover 19. Furthermore, as shown in FIGS. 5 and 6, an internal release mechanism such as a safety release arm extension 59' may be provided to enable a person locked in the cargo area of the truck bed 13 to release the latch assembly 10 from the inside.

It is notable that the term "obstructing position" is defined herein and in the claims to means that position of the stopper mechanism, i.e. pivot arm, where re-engagement of the released latch member to the striker is prevented by the blocking element. Furthermore, and in contrast, the term "non-obstructing position" is defined herein and in the claims to means that position of the stopper mechanism where re-engagement of the released latch member to the striker is not prevented by the blocking element. It is also notable that the stopper mechanism operates to generally obstruct re-engagement of the released latch member 34 with the striker 26, and not necessarily to directly and physically block the path of the released latch member itself to re-engage the striker. It is appreciated that the language "obstructing re-engagement of the released latch member with the striker" encompasses a broader scope and meaning than the interposing of the blocking element 55 between the latch member 34 and the striker 55 to effect obstruction.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. A latch assembly for releasably latching a first body of a truck bed cover and a second body of a truck bed to each other, said first and second bodies adapted to move between open and closed positions relative to each other, said latch assembly comprising:

a striker secured to one of the first and second bodies;

a latch member movably connected to the other of the first and second bodies said latch member being movable between an extended latched position and a retracted unlatched position;

resiliently biasing means movable between a compressed configuration and a more relaxed configuration for urging the latch member in the direction of the striking member and toward its extended, latched position to achieve latched engagement with the striker when the first and second bodies are in the closed position and said resiliently biasing means urges the latch member away from its retracted unlatched configuration;

main actuator means operably connected to the latch member for actuating the latch member to a released position wherein the latch member is released from the striker said main actuator means urging said resiliently biasing means to its compressed configuration; and stopper means for obstructing re-engagement of the released latch member with the striker, said stopper means having a blocking element which is caused to move from a non-obstructing position to an obstructing position upon the latch member being actuated to the released position by the main actuator means, whereby the released latch member is maintained in the released position by the stopper means to enable relative movement of the first and second bodies to the open position.

2. A latch assembly for releasably latching a first body of a truck bed cover and a second body of a truck bed to each other, said first and second bodies adapted to move between open and closed positions relative to each other, said latch assembly comprising:

a striker secured to one of the first and second bodies;

a latch member movably connected to the other of the first and second bodies said latch member being movable between an extended latched position and a retracted unlatched position;

resiliently biasing means movable between a compressed configuration and a more relaxed configuration for urging the latch member in the direction of the striker member and toward its extended, latched position to achieve latched engagement with the striker when the first and second bodies are in a closed position relative to each other and said resiliently biasing means urges the latch member away from its retracted unlatched configuration;

main actuator means operably connected to the latch member for actuating the latch member to a released position wherein the latch member is released from the striker said actuator means urging said resiliently biasing means to its compressed configuration; and stopper means for interposing between the released latch member and the striker to obstruct re-engagement of the released latch member with the striker, said stopper means having a blocking element which is caused to move from a non-interposed position to an interposed position upon the latch member being actuated to the released position by the main actuator means, whereby the released latch member is maintained in the released position by the stopper means to enable relative movement of the first and second bodies to an open position.

3. A latch assembly for releasably latching a first body of a truck bed cover and a second body of a truck bed to each other, said first and second bodies adapted to move between open and closed positions relative to each other, said latch assembly comprising:

a striker secured to one of the first and second bodies;

a latch member movably connected to the other of the first and second bodies;

resiliently biasing means for urging the latch member to achieve latched engagement with the striker when the first and second bodies are in the closed position;

main actuator means operably connected to the latch member for actuating the latch member to a released position wherein the latch member is released from the striker; and stopper means for obstructing re-engagement of the released latch member with the striker, said stopper means having a blocking element which is caused to move from a non-obstructing position to an obstructing position upon the latch member being actuated to the released position by the main actuator means, and wherein the blocking element of the stopper means is movably connected to the latch member and the blocking element is caused to abut against the striker when moved to the obstructing position to abuttingly support the released latch member against the striker and wherein the stopper means is a pivot arm having a base end pivotally connected to the latch member, and a swing end opposite the base end with the blocking element connected thereto, whereby the blocking element is moved to the obstructing position by pivoting the pivot arm about the base end, whereby the released latch member is maintained in the released position by the stopper means to enable relative movement of the first and second bodies to the open position.

4. The latch assembly as in claim 3, wherein the blocking element is interposed between the released latch member and the striker when the blocking element is moved to the obstructing position.

5. The latch assembly as in claim 3, wherein the pivot arm has resiliently biasing means for urging the pivot arm to pivot about the base end and move the blocking element to the obstructing position.

6. The latch assembly as in claim 3, wherein the striker rotates the blocking element to the non-obstructing position as the first and second bodies are moved relative to each other from the open position to the closed position.

7. The latch assembly as in claim 3, wherein the main actuator means comprises a solenoid which, when energized, causes the latch member to move to the released position.

8. The latch assembly as in claim 7, wherein the main actuator means further comprises an activation switch electrically connected to the solenoid which enables energizing of the solenoid for a momentary duration sufficient to move the blocking element to the obstructing position, whereby the obstructing operation of the stopper means is initiated at the end of the momentary duration.

9. The latch assembly as in claim 3, further comprising auxiliary actuator means for alternatively actuating the latch member to the released position, said auxiliary actuator means comprising a contact surface connected to the latch member, a cam for actuating the latch member to the released position via the contact surface, and means for operating the cam.

10. A latch assembly for releasably latching a first body of a truck bed cover and a second body of a truck bed to each other, said first and second bodies adapted to move between open and closed positions relative to each other, said latch assembly comprising:

a striker secured to one of the first and second bodies;

a latch member movably connected to the other of the first and second bodies;

resiliently biasing means for urging the latch member to achieve latched engagement with the striker when the first and second bodies are in a closed position relative to each other;

main actuator means operably connected to the latch member for actuating the latch member to a released position wherein the latch member is released from the striker; and stopper means for interposing between the released latch member and the striker to obstruct re-engagement of the released latch member with the striker, said stopper means having a blocking element which is caused to move from a non-interposed position to an interposed position upon the latch member being actuated to the released position by the main actuator means and wherein the blocking element of the stopper means is movably connected to the latch member and the blocking element is caused to abut against the striker when moved to the interposed position to abuttingly support the released latch member against the striker and wherein the stopper means is a pivot arm having a base end pivotaily connected to the latch member, and a swing end opposite the base end with the blocking element connected thereto, whereby the blocking element is moved to the interposed position by pivoting the pivot arm about the base end.

11. The latch assembly as in claim 10, wherein the pivot arm has resiliently biasing means for urging the pivot arm to pivot about the base end and move the blocking element to the interposed position.

12. The latch assembly as in claim 10, wherein the striker rotates the blocking element to the non-interposed position as the first and second bodies are moved relative to each other from the open position to the closed position.

13. The latch assembly as in claim 10, wherein the main actuator means comprises a solenoid which, when energized, causes the latch member to move to the released position.

14. The latch assembly as in claim 13, wherein the main actuator means further comprises an activation switch electrically connected to the solenoid which enables energizing of the solenoid for a momentary duration sufficient to move the blocking element to the obstructing position, whereby the obstructing operation of the stopper means is initiated at the end of the momentary duration.

15. The latch assembly as in claim 10, further comprising auxiliary actuator means for alternatively actuating the latch member to the released position, said auxiliary actuator means comprising a contact surface connected to the latch member, a cam for actuating the latch member to the released position via the contact surface, and means for operating the cam.

16. A latch assembly for releasably latching a first body of a truck bed cover and a second body of a truck bed to each other, said first and second bodies adapted to move between open and closed positions relative to each other, said latch assembly comprising:

a striker secured to one of the first and second bodies;

a latch member movably connected to the other of the first and second bodies;

resiliently biasing means for urging the latch member to achieve latched engagement with the striker when the first and second bodies are in the closed position;

actuator means operably connected to the latch member for actuating the latch member to a released position wherein the latch member is released from the striker; and a pivot arm for obstructing re-engagement of the released latch member with the striker, said pivot arm having a base end pivotally connected to the latch member, and a swing end opposite the base end with a blocking element connected thereto, the pivot arm being caused to pivot about the base end such that the blocking element is moved from a non-obstructing position to an obstructing position upon the latch member being actuated to the released position by the actuator means, wherein the blocking element abuts against the striker when in the obstructing position to abuttingly support the released latch member against the striker, whereby the released latch member is maintained in the released position by the pivot arm to enable relative movement of the first and second bodies to the open position.

17. The latch assembly as in claim 16, wherein the blocking element is interposed between the released latch member and the striker when the blocking element is moved to the obstructing position.

* * * * *